United States Patent
Stepp

(10) Patent No.: US 7,789,928 B2
(45) Date of Patent: Sep. 7, 2010

(54) FORCED AIR DUCT END FILTER ASSEMBLY

(76) Inventor: Randall Stepp, Site 6 Box 80 RR5, Calgary (CA) T2P 2G6

( * ) Notice: Subject to any disclaimer, the term of this patent is extended or adjusted under 35 U.S.C. 154(b) by 431 days.

(21) Appl. No.: 11/689,828

(22) Filed: Mar. 22, 2007

(65) Prior Publication Data
US 2008/0229723 A1  Sep. 25, 2008

(51) Int. Cl.
B01D 46/00 (2006.01)
(52) U.S. Cl. .................. 55/495; 55/501; 55/DIG. 35; 454/309
(58) Field of Classification Search .............. 55/495, 55/516, DIG. 31, 480, 481, 490, 491–493, 55/508, 511, DIG. 37, DIG. 35, 501; 96/17; 454/309
See application file for complete search history.

(56) References Cited

U.S. PATENT DOCUMENTS

| | | | | |
|---|---|---|---|---|
| 4,334,899 | A * | 6/1982 | McConnell | 55/321 |
| 4,518,402 | A * | 5/1985 | Dargel | 96/17 |
| 5,176,570 | A * | 1/1993 | Liedl | 454/309 |
| 5,525,145 | A * | 6/1996 | Hodge | 96/17 |
| 5,690,719 | A | 11/1997 | Hodge | |
| 5,817,168 | A * | 10/1998 | Wheless | 96/222 |
| 5,863,310 | A * | 1/1999 | Brown et al. | 55/480 |
| 6,030,427 | A * | 2/2000 | Sorice et al. | 55/480 |
| 6,241,794 | B1 | 6/2001 | Jadran et al. | |
| 6,623,540 | B2 | 9/2003 | Clayton et al. | |
| 6,719,820 | B2 | 4/2004 | Wolf et al. | |
| 6,790,261 | B1 * | 9/2004 | Delts | 95/273 |
| 6,793,703 | B1 * | 9/2004 | Sledge et al. | 55/495 |
| 6,814,660 | B1 | 11/2004 | Cavett | |
| 6,918,940 | B1 * | 7/2005 | Lackey et al. | 55/501 |
| 6,942,710 | B2 * | 9/2005 | Milano | 55/480 |
| 7,097,692 | B2 * | 8/2006 | Southland et al. | 95/273 |
| 7,416,577 | B2 * | 8/2008 | Simmons | 55/495 |
| 7,503,953 | B2 * | 3/2009 | Sundet et al. | 55/499 |
| 7,524,362 | B2 * | 4/2009 | Wu et al. | 96/15 |
| 7,575,617 | B2 * | 8/2009 | Ferguson | 55/480 |
| 2001/0053668 | A1 | 12/2001 | Berger | |
| 2002/0022450 | A1 | 2/2002 | Berger | |
| 2003/0145568 | A1 | 8/2003 | Hodge | |
| 2003/0211823 | A1 | 11/2003 | Wolf et al. | |
| 2004/0003718 | A1 | 1/2004 | Milano | |

* cited by examiner

Primary Examiner—Duane Smith
Assistant Examiner—Minh-Chau Pham
(74) Attorney, Agent, or Firm—Maxey Law Offices, PLLC; Stephen Lewellyn

(57) ABSTRACT

A filter assembly for mounting over an opening at an end of a forced air system duct, such as a cold air return. The filter assembly is designed to replace an existing louvered grill covering. The filter assembly is dimensioned which substantially retains the shape and appearance of the conventional duct grill being replaced. The filter assembly includes a filter frame having a perforated back wall, horizontal and vertical walls extending forwardly from the periphery of the perforated back wall defining an open front end and a filter receiving space between the perforated back wall and the open end. A rectangular grill having a peripheral flange extending rearwardly therefrom. The rectangular filter frame being received interiorly of the peripheral flange. A filter element being removably seated within the filter receiving space and being sandwiched between the perforated back wall and the grill causing the entire surface of the filter element to substantially contact the perforated back wall.

7 Claims, 3 Drawing Sheets

FORCED AIR DUCT END FILTER ASSEMBLY

BACKGROUND OF THE INVENTION

1. Field of the Invention

The present invention relates generally to filter assemblies for forced air heating and ventilation systems, and more particularly, relating to an air duct end filter assembly for filtering cold return air.

2. Description of the Related Art

The use of air duct end filter assemblies is known in the prior art. More specifically, air duct end filter assemblies heretofore devised and utilized are known to consist of expected, obvious, and familiar structural configurations, notwithstanding the wide variety of designs encompassed by the crowed prior art which have been developed for the fulfillment of a myriad of objects and requirements.

Descriptions of such heretofore devices are found in U.S. Pat. Nos. 4,334,899; 5,176,570; 5,690,719; 5,863,310; 6,030,427; 6,241,794; and 6,942,710.

While the devices heretofore fulfill their respective, particular objectives and requirements, they do not provide an improved forced air duct end filter assembly. As such the forced air duct end filter assembly according to the present invention substantially departs from the concepts and designs of the prior art, and in doing so provides an apparatus which is easy to install as a replacement to conventional duct grills without modification to the grill mounting structure and which substantially retains the shape and appearance of the conventional duct grill being replaced.

SUMMARY OF THE INVENTION

In view of the foregoing disadvantages inherent in the known types of duct end filter assemblies now present in the prior art, the present invention provides a new duct end filter assembly construction wherein the same can be used in replacement of a duct grill typically used to cover the duct end of the cold air return to a forced air furnace or other forced heating or cooling and ventilation system.

In general, in one aspect, a duct end filter assembly is provided including a filter frame having sidewalls defining an open back end, an open front end and a filter receiving space between said open front and back ends, a perforated wall completely covering the open back end, a grill removably attachable to the filter frame to completely cover the open front end, and a filter element removably seated in the filter receiving space and sandwiched between the perforated wall and the grill.

In general, in another aspect, a duct end filter assembly is provided including a rectangular filter frame having a perforated back wall, horizontal and vertical walls extending forwardly from the periphery of the perforated back wall defining an open front end and a filter receiving space between the perforated back wall and the open end. A rectangular grill having a peripheral flange extending rearwardly therefrom. The rectangular filter frame being received interiorly of the peripheral flange. A filter element being removably seated within the filter receiving space and being sandwiched between the perforated back wall and the grill causing the entire surface of the filter element to substantially contact the perforated back wall.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
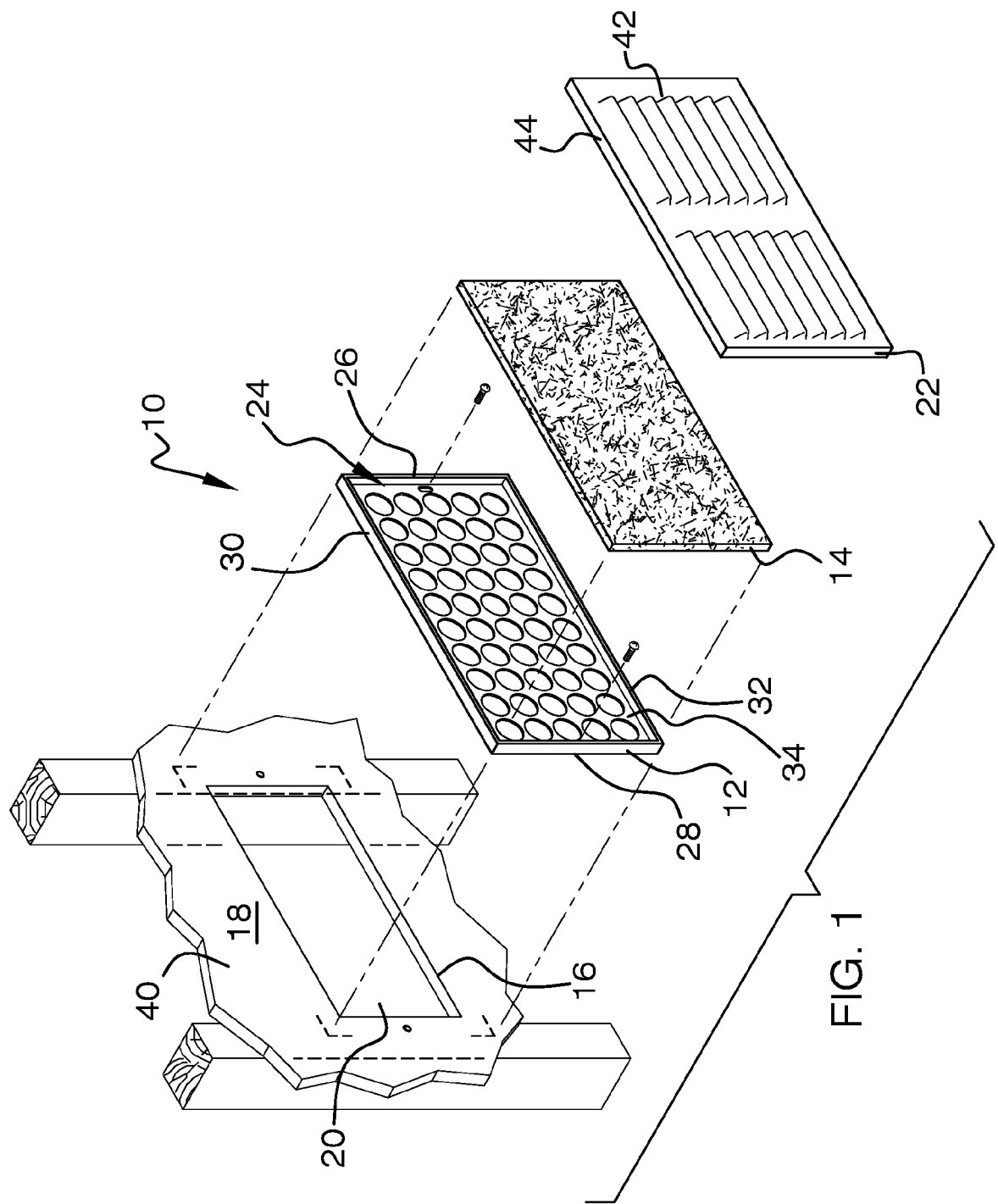
FIG. 1 is an exploded perspective view of a forced air duct end filter assembly constructed in accordance with the principles of the present invention.

Referring now to FIGS. 1-4 of the drawings, reference numeral 10 generally designates the forced air duct end filter assembly constructed in accordance with the principals of the present invention.

Figure 2:
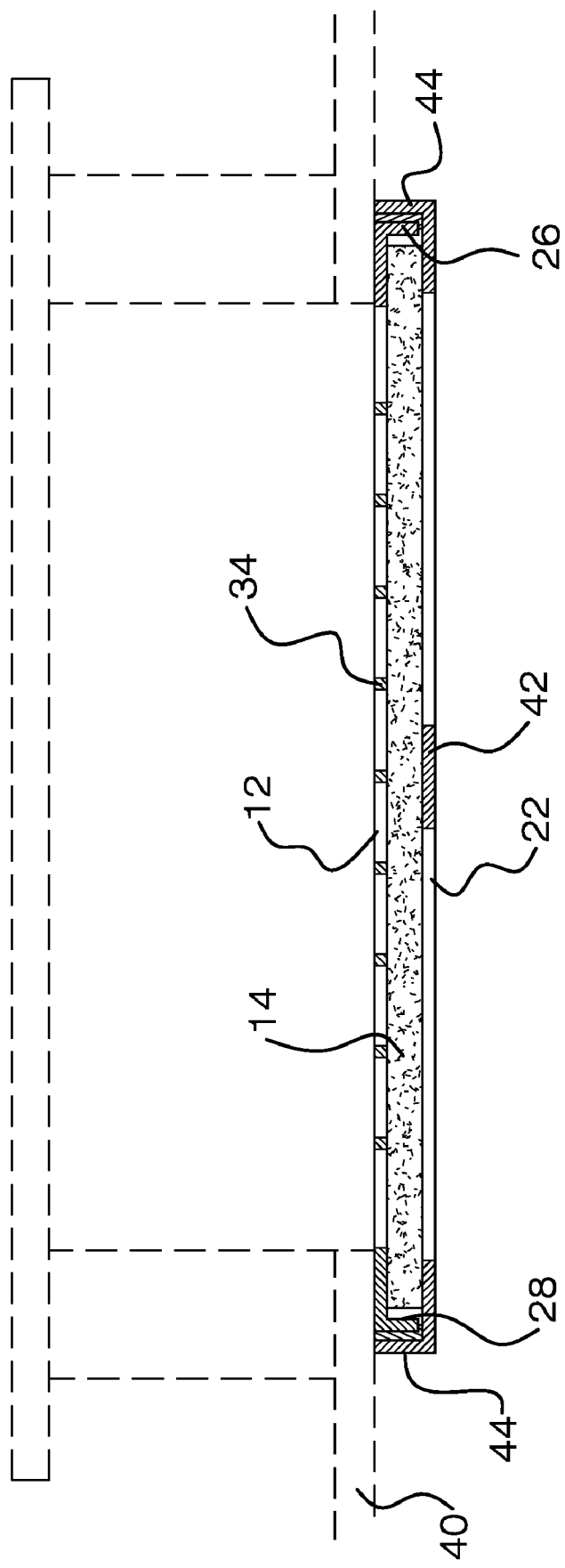
FIG. 2 is a cross sectional view taken laterally across the filer assembly shown in FIG. 1 assembled.

As shown in FIGS. 1 and 2, the duct end filter assembly 10 includes a rigid filter frame 12 for receiving and holding a filter element 14 to filter ventilation air entering opening 16 formed through room end opening 18 of a cold air return (or supply) duct 20 of a forced heating or cooling ventilation system. A grill frame 22 including louvers for the passage of air, is configured to be removably secured to the filter frame 12 to retaining the filter element 14 within filter frame.

The filter frame 12 is rectangular in configuration and is generally of a hollow frame which forms a filter receiving space 24 for receiving the filter element 14. The filter frame 12 being defined by left and right vertically extending opposed sidewalls 26, 28, and horizontal upper and lower sidewalls 30, 32. The horizontal sidewalls 30, 32 and the vertical sidewall 26, 28 extend forwardly from the periphery of a perforated back wall 34 and define the filter receiving space 24 and an open front end 36 through which the filter element 14 is inserted into the filter receiving space. The filter frame 12 is adapted to be mounted on wall 40 over the opening 16 which is formed through the wall.

The filter frame 12 is sized such that the perforated back wall 34 is at least equal in size to the opening 16. Ideally, the filter frame 12 is sized to closely correspond with a duct grill covering (not shown) that is being replaced by the filter assembly 12 so as to permit the installation and mounting of the filter frame 12 without modification to the wall 40, the opening 16 and surroundings. Alternatively, the duct end filter assembly 10 can be installed as new construction.

The removable grill frame 22 is rectangular in configuration and includes front face 42 and a rearwardly extending peripheral flange 44. The grill frame 22 is dimensioned so that its overall height and length is slightly larger than the filter frame 12 so that the grill frame will freely slide over the filter frame in an interference fit with the horizontal sidewalls 30, 32 and the vertical sidewalls 26, 28 being receive interiorly of the peripheral flange 44.

In assembled condition, the filter element 14 is positioned within the filter receiving space 24 and is sandwiched between the perforated back wall 34 and the front face 42 of the grill frame 22. The width of the filter receiving space 24 as defined as the distance between the front face 42 and the perforated back wall 34 is slightly less than the thickness of the filter element 14 such that the filter element is compressed against the perforated back wall when the grill frame is 22 is attached to the filter frame 12. The compressing and sandwiching of the filter element 14 between the perforated back wall 34 and the front face 42 results in the entire reward surface area of the filter element to be in contact with the perforated back wall, thereby providing support to the filter element 14 that is not found in the devices heretofore.

The prior art devices heretofore typically only support the filter element around the perimeter thereof or along discrete lengths across the length or height of the filter element. This becomes problematic as the filter element becomes dirty during service resulting in an increase in differential pressure across the filter causing the filter to bow in the direction of the lower pressure. If the filter is not replaced and is allowed to become further dirty, before long, gaps are formed between the edges of the filter element and the filter assembly. The gaps permit air to pass around the filter and carry dust and debris into the duct where it tends to accumulate leading to mold problems. The perforated back wall 34 of the present air filter assembly 12 supports the filter element 14 substantially across its entire surface, and this in prevents the filter from bowing and forming air gaps.

Figure 3:
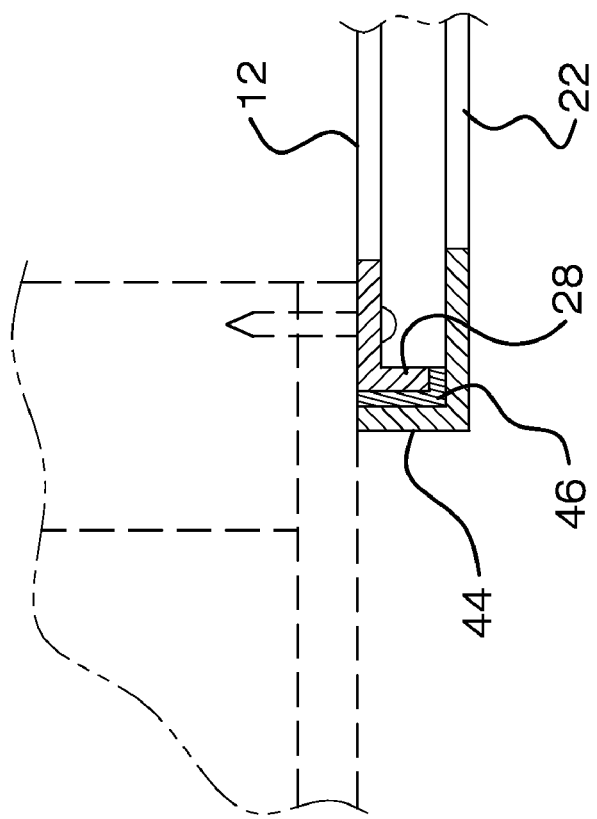
FIG. 3 is an enlarged detail view of a portion of the filter assembly shown in FIG. 2.

With reference to FIG. 3, in addition to the interference fit between the peripheral flange 44 of the grill frame 22 and the horizontal sidewalls 30, 32 and vertical sidewalls 26, 28 a magnetic catch including a magnetic strip 46 can be attached to either the grill frame or filter frame to attract an ferrous portion of the opposing member, thereby fastening the members together.

Figure 4:
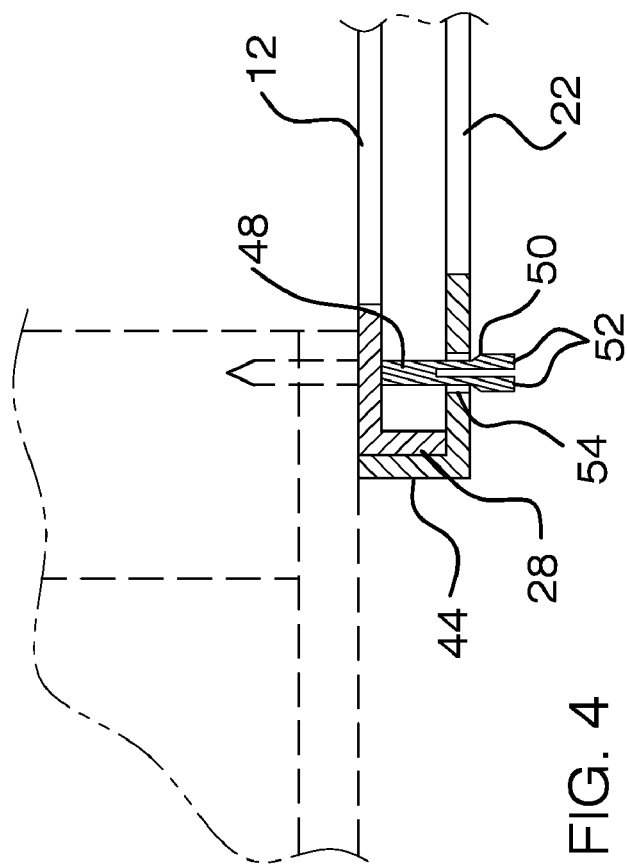
FIG. 4 is the enlarged detail view of FIG. 3 showing an alternate embodiment.

With reference to FIG. 4, in an alternate method, and in addition to the interference fit between the peripheral flange 44 and of the grill frame 22 and the horizontal sidewalls 30, 32 and vertical sidewalls 26, 28 on or more resilient catches 48 can be used to help secure the grill frame to the filter frame. The resilient catch 48 is attached to the filter frame 12 and includes a bifurcated end 50 having resilient furcations 52 that when pressed together are free to pass through a cooperation through hole 54 formed through the front face 42 of the grill frame 22 and when released extend beyond the circumference of said cooperating hole, thereby preventing removal of said grill from said filter frame. A resilient catch 48 and cooperating through hole 54 can be positioned at opposed ends of the filter assembly 10.

A number of embodiments of the present invention have been described. Nevertheless, it will be understood that various modifications may be made without departing from the spirit and scope of the invention. Accordingly, other embodiments are within the scope of the following claims.

I claim:

1. A filter assembly comprising:
   a filter frame having sidewalls defining a filter receiving space and an open front end, and a perforated back wall from which said sidewalls forwardly extend;
   a grill frame removably attachable to said filter frame to completely cover said front opening;
   a filter element having opposed front and rear surfaces is removably seated in said filter receiving space and sandwiched between said perforated back wall and said grill frame such that substantially the entire rear surface is in contact with said perforated back wall; and
   wherein said grill frame includes a louvered front surface and a peripheral flange rearwardly extending from said front surface and sized such that said sidewalls of said filter frame are interiorly received by said peripheral flange in an interference fit.

2. The filter assembly of claim 1, wherein the width of said filter receiving space is defined as the distance between said perforated back wall of said filter frame and said front surface of said grill frame is less than the thickness of said filter element.

3. The filter assembly of claim 1, further comprising:
   a magnetic catch attached to said filter frame and engagable with said grill frame to releasable secure said grill to said filter frame.

4. The filter assembly of claim 3, wherein said magnetic catch includes a magnetic strip attached to an outward facing surface of at least one sidewall of said sidewalls.

5. The filter assembly of claim 1, further comprising:
   a grill catch attached to said filter frame, said grill catch comprising a bifurcated end including resilient furcations that when compressed together are free to pass through a cooperating hole formed through said grill and when released extend beyond the circumference of said cooperating hole, thereby preventing removal of said grill from said filter frame.

6. The filter assembly of claim 1, wherein said filter frame is rectangular-shaped.

7. A forced air duct end filter assembly for placement over an opening at a room duct end of a forced air heating system extending through a wall, the forced air duct end filter assembly comprising:
   a filter element having front and back surfaces;
   a filter frame having a perforated back wall and a sidewall extending completely around the periphery of said back wall and extending forwardly therefrom and terminating at forward facing end defining an open front, said back wall being sized at least equal to the opening at a room duct end, said filter frame attached to the wall over the opening at a room duct end with said filter frame in direct contact with the wall;
   a grill frame having a louvered front face and a flange extending completely around the periphery of said louvered front face and extending rearwardly therefrom and terminating a rearward facing end, said sidewall of said filter frame is removably received interiorly of said flange with said flange and said sidewall in an interference fit and with said louvered front face covering said open front of said filter frame, and defining a filter receiving space between said perforated back wall of said filter frame and said louvered front face of said grill frame, said filter receiving space being less than the thickness of said filter element; and said filter element is removably positioned in said filter receiving space and is compressed between said perforated back wall of said filter frame and said louvered front face of said grill frame with substantially the entire rear surface of said filter element in contact with said perforated back wall.

* * * * *